2,937,952
GLASS COMPOSITIONS

John J. Smith, Natrona Heights, Pa., and Earl T. Middleswarth, Amesbury, Mass., assignors to Pittsburgh Plate Glass Company, Allegheny County, Pa., a corporation of Pennsylvania No Drawing. Filed Aug. 28, 1958, Ser. No. 757,700

3 Claims. (Cl. 106—52)

This invention relates to certain green ophthalmic crown glasses which depend largely upon iron oxide for their spectral transmittance properties and it has particular relation to such glasses having higher softening point temperatures than have heretofore been available. This application is a continuation-in-part of our copending application Serial No. 542,098, filed October 21, 1955 and now abandoned.

Green, eye-protective glasses are conventionally marketed in several shades or optical densities, often designated as shades A, B, C or D, each of which must conform to specific transmittance requirements. Also, because of their use in multifocal prescription spectacle lenses, these glasses are required to have indices of refraction ($N_D$) in the neighborhood of 1.510 to 1.535, dispersive indices ($v$) of above 50, controlled thermal expansion characteristics, and other desirable physical properties such as good chemical durability and resistance to devitrification.

The green ophthalmic crown glasses known in the prior art have lower softening points than the white or clear ophthalmic crown glasses. The reasons for this are well known. The white ophthalmic crown glasses contain about 70 percent by weight $SiO_2$, 8.5 percent by weight $Na_2O$, 7.5 percent by weight $K_2O$, 12 percent by weight CaO and about 2 percent by weight refining agents. Upon introducing an amount of iron oxide in these glasses sufficient for the absorption of light, it becomes necessary to decrease the CaO content of the base glass in order to maintain the desired refractive index. This decrease in the CaO content, in turn, substantially lowers the softening point of the glass and the amount the softening point is decreased depends on the optical density sought. That is, the greater the optical density, the greater the decrease in softening point.

In the production of multifocal lenses, a button of a flint or barium type segment glass is generally fused to a crown lens that has previously been ground to a desired curvature. In order to effect the fusion of the segment glass to the crown lens without distorting the latter, it is customary to employ segment glasses that have softening points 50 to 150° F. lower than that of the crown glass. But the conventional green ophthalmic crown glasses have softening points 30 to 50° F. lower than those of the clear crown glasses. Thus, the manufacture of multifocal lenses utilizing the iron oxide-green ophthalmic crown glasses and conventional clear or tinted segment glasses has not been entirely successful because the difference in softening points of the glasses is too small. The crown lens is frequently distorted during the fusion.

Attempts of the prior art to produce segment and green crown glasses suitable for fusing to each other to form a multifocal lens have taken one of two obvious courses. Attempts have been made (1) to develop a complete new line of minor segment glasses with lower softening points than ordinary segment glasses and (2) to develop new green ophthalmic crown glasses with higher softening points substantially equal to those of a clear crown glass.

Some new minor segment glasses have been produced; however, these glasses are costly and of doubtful practicability. Their use requires two entirely separate sets of segment glasses, one for use with clear crown glasses and the other for use with the green ophthalmic crown glasses. This greatly multiplies the number of ingredients to be handled, inventories and manufacturing variabilities.

Attempts to produce a higher softening point, green, ophthalmic crown glass have been made but have been unsuccessful. These attempts have consisted of introductions of alumina and/or combinations of boric and titanium oxides along with alterations in the amounts or ratios of sodium and potassium oxides.

In view of the above, one of the objects of the present invention is to provide a green ophthalmic crown glass with a softening point similar to that of a clear ophthalmic crown glass, i.e., about 1325 to 1345° F. It is a further object of this invention to produce a green ophthalmic crown glass containing iron oxide as the colorant and having a softening point of about 1325 to 1345° F.

Another object of the invention is to provide green ophthalmic crown glasses containing iron oxide which can be used satisfactorily in the manufacture of multifocal spectacle lenses with conventionally used segment glasses.

In accordance with the present invention, it has been found that it is possible to make improved green ophthalmic crown glasses containing iron oxide by introducing in carefully controlled amounts, a cheap, readily available material, namely MgO. It has been found that such a glass containing MgO will have a higher softening point per unit of refractive index than the same type of glass made without MgO. This is possible because it takes a greater sum total of the oxides of calcium and magnesium than of calcium alone in order to maintain a specific refractive index in an iron containing, green ophthalmic crown glass. The greater sum total of these bivalent metal oxides results in a higher softening point per unit refractive index.

It has also been discovered that the introduction of MgO into the composition appears to affect the light absorption qualities of the iron oxide so that lower percentages of iron oxide are necessary for equivalent absorption than were needed in the MgO-free glass. This means that the unfavorable effects of iron oxide on softening point are further minimized.

These glasses containing MgO have the requisite green color and transmittance properties. In addition, they have the proper thermal expansion for fusing to minor segment glasses, good durability, resistance to devitrification, proper index of refraction and reciprocal dispersion. At the same time, they have softening points substantially higher than previously attainable.

Glasses of the present invention have the compositions set forth in the table below wherein the amounts of the ingredients are set forth in percent by weight:

| Compositions | Percent by weight | | |
|---|---|---|---|
| | 1 | 2 | Preferred range |
| $SiO_2$ | 70 | 70.5 | 65 to 75 |
| $Na_2O$ | 8 | 8.3 | 7 to 10 |
| $K_2O$ | 8.5 | 8.0 | 7 to 10 |
| CaO | 5.3 | 7.2 | 5 to 8 |
| MgO | 3.7 | 2.4 | 2 to 4 |
| $Fe_2O_3$ | 4.1 | 3.2 | 2.8 to 5 |
| $SO_3$ | 0.4 | 0.4 | |
| Softening point, ° F. | 1,333 | 1,335 | |
| Index of Refraction, $N_D$ | 1.523 | 1.523 | |
| Reciprocal Dispersion (V) | 52 | 52 | |
| Coefficient of Thermal Expansion $\times 10^{-7}$ per ° C. between 25° C. and 300° C. | 90 | 90 | |

The glasses of the invention may be produced from conventional glass making materials properly compounded and thoroughly mixed so as to yield, when reacted, glasses of the desired ultimate composition. Various size pots or crucibles may be employed and the melting temperatures and times will vary according to the amount of glass being formed. The temperatures and melting conditions recited below may be employed to make 85 to 100 pounds of glass in a clay pot in a furnace heated by the controlled combustion of natural gas.

An empty pot is preheated in the furnace at a furnace temperature of about 2200° F. A portion of the mixed batch is ladled into the preheated pot and the furnace temperature is gradually increased. The remaining portion of the mixed batch is ladled into the pot over a period of 2½ hours and the temperature is raised to about 2640° F. During the next hour, the furnace temperature is further increased to between 2650° F. and 2670° F. and within this time, substantially all of the glass making materials are melted.

A clay thimble supported by a water cooled core and driving arm is then inserted in a vertical position into the molten mass within the pot. The temperature of 2650° F. to 2670° F. is maintained for two more hours, during which time the chemical reactions are completed and the glass is substantially freed of bubbles. A neutral or slightly oxidizing atmosphere is maintained within the furnace during the melting and high temperature refining just described.

After the glass has been substantially freed of bubbles, the temperature of the furnace is reduced in one-half hour to between 2500° F. and 2300° F. The glass is then stirred by mechanically propelling the clay thimble through the glass in a circular or spiral motion. Mechanical stirring is continued for one hour and the furnace temperature is slowly lowered to between 2200° F. and 2250° F. The stirring thimble is removed from the refined glass and the pot is removed from the furnace. The molten glass is poured on a metal table and rolled into the form of a plate. The plate is placed in a kiln and cooled from 1050° F. to 850° F. at a rate of 3° F. per minute. Thereafter, it is cooled more rapidly to room temperature and cut into pieces suitable for fabrication or tests.

The amounts of the different components of the glass may vary. The ranges set forth above described approximate limitations which these variations may take and remain within the purview of the invention. For example, $SiO_2$ is employed in the glass as the principal glass former. If an amount greater than 75 percent by weight $SiO_2$ is used, the glass is difficult to melt, whereas, if less than about 65 percent by weight $SiO_2$ is present, the durability of the glass is poor. The amount of the alkali metal oxide, $Na_2O$ plus $K_2O$, is maintained between 15.5 to 17.5 percent by weight. The alkali metal oxides are employed to aid in melting of the glass and to obtain desirable thermal expansion properties.

The sum of CaO and MgO in the glass should be about 7 to 10.5 percent by weight. This is necessary to provide the glass with the proper index and refraction, reciprocal dispersion, softening point, and coefficient of thermal expansion. The MgO should be between 2 to 4 percent by weight so that the high softening point, i.e., around 1335° F. is obtained.

The amount of $Fe_2O_3$ may be varied between 2.8 to 5 percent by weight of the glass. The presence of the MgO in the glass enables smaller amounts of $Fe_2O_3$ to be employed to obtain the desired green color and transmittance properties. It is to be understood that while the iron oxide in the glass is reported as ferric oxide, the presence of both ferrous and ferric iron is acknowledged.

Up to 2 percent by weight of refining agents may be employed. Sulphates in the form of $Na_2SO_4$ have been used and $As_2O_5$ and $Sb_2O_3$ are contemplated, as well as other conventional refining agents.

The ingredients of the glasses of the present invention must be maintained within the ranges set forth above in order to obtain a glass having the large number of requisite properties. The glasses of the present invention have softening points of about 1335° F., a refractive index of about 1.523, a reciprocal dispersion greater than 50, a coefficient of thermal expansion of about 89 to $93 \times 10^{-7}$ per ° C. and color and transmittance properties matching standard green ophthalmic glasses. In addition, the glasses have good chemical durability and resistance to devitrification.

Although the present invention has been described with respect to specific details of certain embodiments thereof, it is not intended that such details act as limitations upon the scope of the invention except insofar as included in the accompanying claims.

We claim:

1. A green ophthalmic crown glass having an index of refraction $N_D$ of about 1.523, a softening point of about 1330° F. and a coefficient of thermal expansion of about 89 to $93 \times 10^{-7}$ per ° C. between 25° C. and 300° C. consisting of the following ingredients in percent by weight: 65 to 75 percent $SiO_2$, 7 to 10 percent $Na_2O$, 7 to 10 percent $K_2O$, 5 to 8 percent CaO, 2 to 4 percent MgO and 2.8 to 5 percent $Fe_2O_3$, the sum of $Na_2O$ and $K_2O$ being 15.5 to 17.5 and the sum of CaO and MgO being 7 to 10.5.

2. A glass consisting essentially of the following ingredients in percent by weight: 70 percent $SiO_2$, 8 percent $Na_2O$, 8.5 percent $K_2O$, 5.3 percent CaO, 4.1 percent $Fe_2O_3$, 3.7 percent MgO and 0.4 percent $SO_3$.

3. A glass consisting essentially of the following ingredients in percent by weight: 70.5 percent $SiO_2$, 8.3 percent $Na_2O$, 8 percent $K_2O$, 7.2 percent CaO, 3.2 percent $Fe_2O_3$, 2.4 percent MgO and 0.4 percent $SO_3$.

References Cited in the file of this patent

UNITED STATES PATENTS

| | | |
|---|---|---|
| 2,382,282 | Austin et al. | Aug. 14, 1945 |
| 2,552,125 | Tillyer | May 8, 1951 |
| 2,688,560 | Armistead | Sept. 7, 1954 |